US012572186B2

(12) United States Patent
Ye et al.

(10) Patent No.: US 12,572,186 B2
(45) Date of Patent: Mar. 10, 2026

(54) ELECTRONIC DEVICE INCLUDING TOUCH FRAME BAR

(71) Applicant: TPK Advanced Solutions Inc., Xiamen (CN)

(72) Inventors: Cai Jin Ye, Xiamen City (CN); Tsai Kuei Wei, Hsinchu County (TW); Wei Yi Lin, Taoyuan City (TW); Chen Hsin Chang, Taoyuan City (TW); Tai Shih Cheng, Taipei City (TW)

(73) Assignee: TPK Advanced Solutions Inc., Xiamen (CN)

( * ) Notice: Subject to any disclaimer, the term of this patent is extended or adjusted under 35 U.S.C. 154(b) by 0 days.

(21) Appl. No.: 18/948,863

(22) Filed: Nov. 15, 2024

(65) Prior Publication Data

US 2025/0190032 A1     Jun. 12, 2025

(30) Foreign Application Priority Data

Dec. 8, 2023    (CN) .......................... 202311685247.7

(51) Int. Cl.
G06F 1/16        (2006.01)
G06F 3/01        (2006.01)
G06F 3/0354      (2013.01)

(52) U.S. Cl.
CPC .............. G06F 1/169 (2013.01); G06F 3/016 (2013.01); G06F 3/03547 (2013.01)

(58) Field of Classification Search
None
See application file for complete search history.

(56) References Cited

U.S. PATENT DOCUMENTS

| | | | |
|---|---|---|---|
| 12,189,860 B1* | 1/2025 | Tsen ...................... | G06F 3/0489 |
| 2009/0315867 A1* | 12/2009 | Sakamoto ............. | G06F 3/0488 |
| | | | 345/184 |
| 2017/0010846 A1* | 1/2017 | Bernstein ................ | G06F 3/048 |
| 2017/0090654 A1* | 3/2017 | Silvanto .............. | G06F 3/04886 |
| 2021/0325993 A1* | 10/2021 | Xu ........................ | G06F 3/0416 |

* cited by examiner

*Primary Examiner* — Kirk W Hermann
(74) *Attorney, Agent, or Firm* — Cooper Legal Group, LLC

(57)                ABSTRACT

An electronic device includes a display and an input device. The input device includes a keyboard set, a touchpad, and a touch frame bar. The touch frame bar includes a cover plate, a touch circuit board, a haptic feedback module, and a light source module. The cover plate has symbolic patterns. The touch circuit board is opaque and disposed under the cover plate. The haptic feedback module is disposed on one side of the touch circuit board. The light source module is disposed between the cover plate and the touch circuit board. The input device has an outer side edge extending in a width direction. The outer side edge and the touch frame bar have a first width and a second width respectively in the width direction. A ratio of the second width to the first width is less than 20%.

20 Claims, 7 Drawing Sheets

ELECTRONIC DEVICE INCLUDING TOUCH FRAME BAR

CROSS-REFERENCE TO RELATED APPLICATIONS

The present application claims priority to China Patent Application 202311685247.7, filed Dec. 8, 2023, which is incorporated herein by reference.

FIELD OF DISCLOSURE

The present disclosure relates to an electronic device, especially an electronic device having a touch function.

DESCRIPTION OF RELATED ART

As the demands for haptic touch applications increase significantly, relevant integration applications have been developed accordingly. Because of the increasing demands for features, such as mobility and portability, consumers pay much more attention to the products equipped with applications of touch functions, haptic features, and display functions.

Some existing electronic devices (for example, laptop computers) have both a touchpad and a touch bar; and the keyboard thereof is located between the touchpad and the touch bar. However, when a user grabs a currently available electronic device from its side while its screen remains open, the user may press the touch bar easily by accident.

Therefore, the industry needs to find solutions to the aforementioned problems of electronic devices and should invest in its research and development resources.

SUMMARY

In view of this, one objective of the present disclosure is to provide an electronic device that can solve the aforementioned problems.

In order to achieve the aforementioned objective, based on one embodiment of the present disclosure, an electronic device comprising a display and an input device is disclosed. The input device comprises a keyboard set, a touchpad, and a touch frame bar. The touch frame bar comprises a cover plate, a touch circuit board, a haptic feedback module, and a light source module. The cover plate has symbolic patterns. The touch circuit board is opaque and disposed under the cover plate. The haptic feedback module is disposed on one side of the touch circuit board. The light source module is disposed between the cover plate and the touch circuit board. The input device has an outer side edge extending in a width direction. The outer side edge and the touch frame bar have a first width and a second width respectively in the width direction. A ratio of the second width to the first width is less than 20%.

In one or several embodiments of the present disclosure, the cover plate comprises a first display area and two second display areas. The first display area is connected to and located between these two second display areas in the length direction. The touch frame bar has a first length in the length direction. Each second display area has a second length in the length direction. A ratio of the second length to the first length is less than 15%.

In one or several embodiments of the present disclosure, the second display area is defined by the vertical projection of the haptic feedback module on the cover plate.

In one or several embodiments of the present disclosure, the input device further comprises a holding member and a plurality of vibration isolators. The holding member is mounted under the cover plate and holds the touch circuit board. The vibration isolators are disposed between the touch circuit board and the holding member.

In one or several embodiments of the present disclosure, the haptic feedback module comprises an embedded coil layer and a magnet set. The embedded coil layer is disposed on the touch circuit board and is away from the cover plate. The magnet set is disposed on the holding member and constitutes a vibration module with the embedded coil layer.

In one or several embodiments of the present disclosure, the second display area is defined by the vertical projection of the vibration module on the cover plate.

In one or several embodiments of the present disclosure, the haptic feedback module further comprises a plurality of force sensors. The force sensors are disposed on the touch circuit board.

In one or several embodiments of the present disclosure, the second display area is defined by the vertical projection of the combination of the vibration module and the force sensors on the cover plate.

In one or several embodiments of the present disclosure, the light source module comprises at least one light guide plate and at least one light-emitting member. The light guide plate is disposed between the cover plate and the touch circuit board. The light-emitting member is disposed on the touch circuit board and configured to emit light toward the light guide plate.

In one or several embodiments of the present disclosure, the number of at least one aforementioned light guide plate and the number of at least one aforementioned light-emitting member are plurality. The light-emitting members emit light toward the light guide plate respectively.

In summary, in the electronic device of the present disclosure, by setting the ratio of the width of the touch frame bar in the width direction to the width of the outer side edge of the input device in the width direction to be less than 20%, the user can effectively avoid pressing the touch frame bar accidentally while grabbing the outer side edge of the input device as the display of the electronic device remains open at the same time. In addition, by setting the ratio of the length of every second display area of the cover plate of the touch frame bar in the length direction to the length of the touch frame bar in the length direction to be less than 15% and having the haptic feedback module correspondingly disposed under the second display area, feedback can be enhanced when important keys are pressed. When the haptic feedback module further comprises force sensors, keystrokes by mistake can be prevented effectively.

The aforementioned statements are used for explaining the problems that can be solved by the present disclosure, the technical means for solving the problems, and the effect thereof. The present disclosure will become more fully understood from the detailed descriptions given herein below by way of embodiments with reference to the accompanying drawings for illustration only.

BRIEF DESCRIPTION OF THE DRAWINGS

To better understand the aforementioned objectives and other objectives, as well as novel features, advantages, embodiments, and the effect of the present disclosure, relevant diagrams are provided as follows.

DETAILED DESCRIPTION

Figure 1:
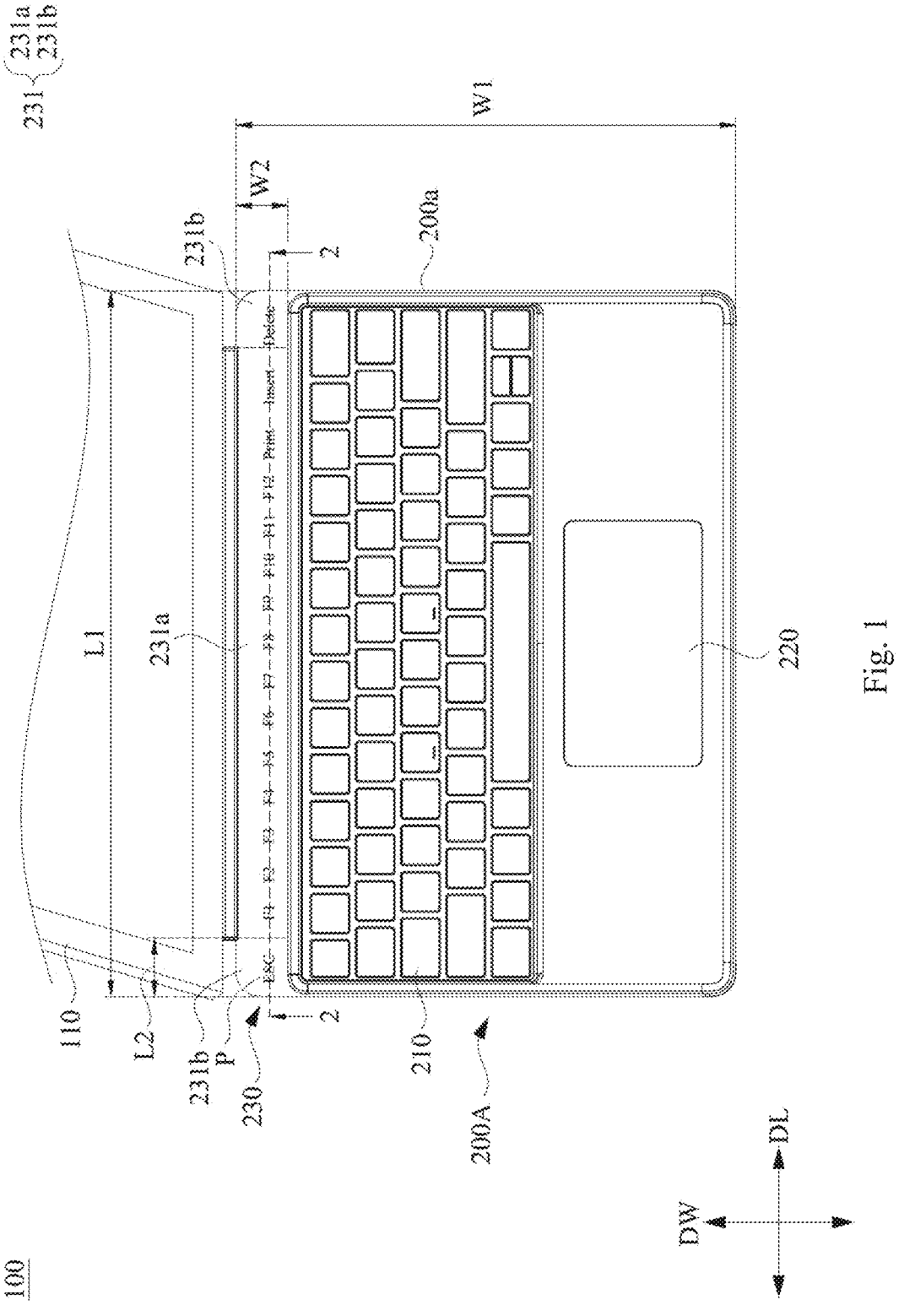
FIG. 1 is a schematic diagram of an electronic device of an embodiment of the present disclosure.

A plurality of embodiments of the present disclosure will be disclosed below with reference to drawings. For purpose of clear illustration, many details in practice will be provided together with the following descriptions. However, these detailed descriptions in practice are for illustration only, and should not be interpreted to limit the scope, applicability, or configuration of the present disclosure in any way. That is, in some embodiments of the present disclosure, these details in practice are not required. Furthermore, for purpose of simplifying drawings, some structures and components of the prior art shown in the drawings will be illustrated schematically.

Please refer to FIG. 1, which is a schematic diagram of an electronic device 100 of an embodiment of the present disclosure. In the embodiment shown in FIG. 1, the electronic device 100 comprises a display 110 and an input device 200A. The display 110 is connected with the input device 200A (for example, through a pivot or hinge device) and can turn over/rotate mutually to open and close. The input device 200A comprises a keyboard set 210, a touchpad 220, and a touch frame bar 230. The keyboard set 210 is disposed between the touchpad 220 and the touch frame bar 230. The touchpad 220 is disposed on one side of the keyboard set 210 away from the display 110. The touch frame bar 230 is disposed on one side of the keyboard set 210 close to the display 110. The rectangular area of the touchpad 220 can be stretched to a bigger dimension in the left and right direction (that is, a longer rectangular touchpad 220), wherein the dimension of the rectangular area is not limited to the one illustrated in FIG. 1. Although the electronic device 100 of the embodiment is illustrated as part of a laptop computer, the present disclosure is not limited thereto. In other words, the concept of the electronic device 100 of the present disclosure can be implemented for any electronic products having a touchpad 220 and/or a touch frame bar 230 as an input or operation interface. The following paragraphs indicate in detail the structures, functions, connections, and operational relationships therewithin of part of the elements of the electronic device 100.

Figure 2:
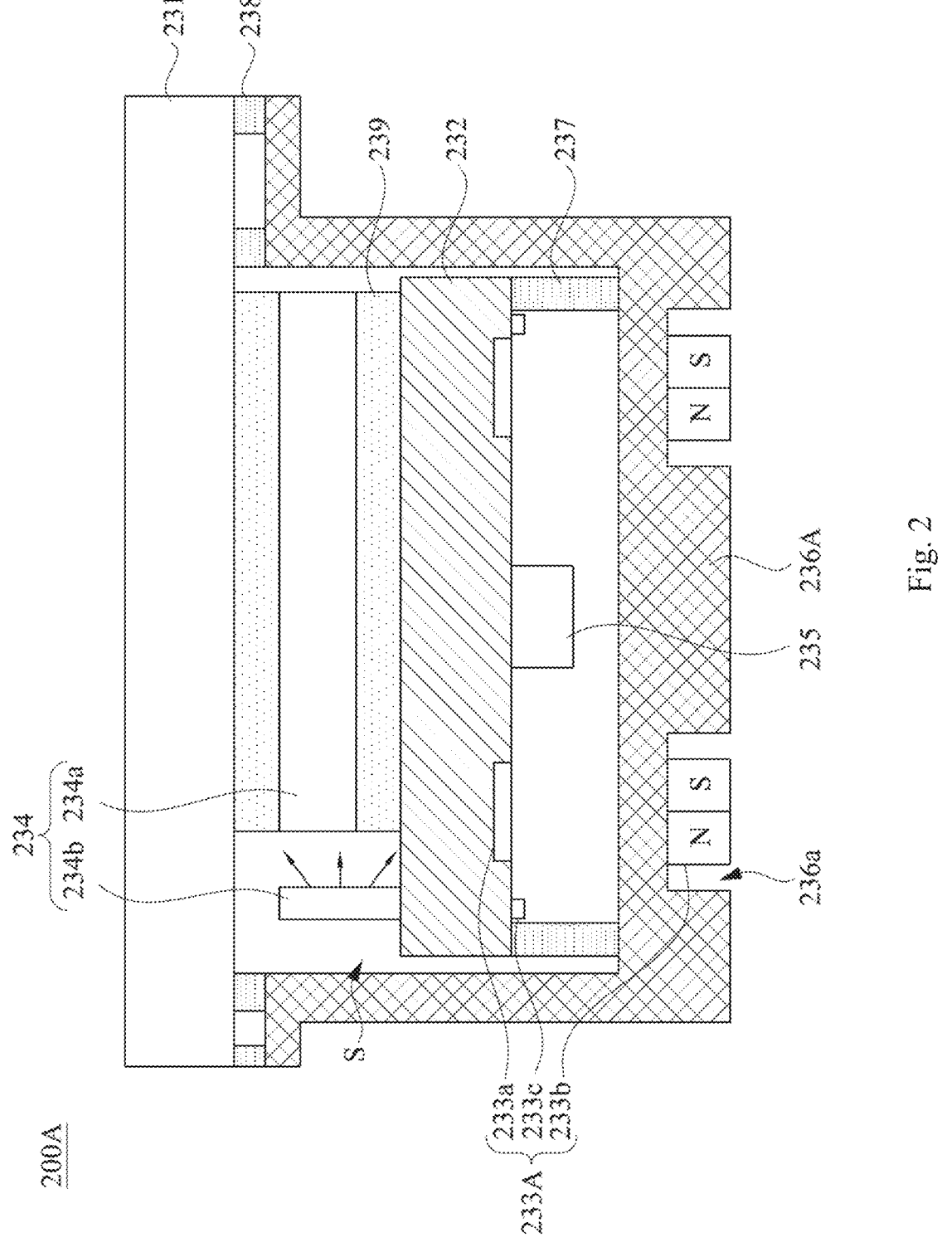
FIG. 2 is a partial cross-sectional schematic diagram of the electronic device of FIG. 1 along the 2-2 cutting plane line.

Please refer to FIG. 2, which is a partial cross-sectional schematic diagram of the electronic device 100 of FIG. 1 along the 2-2 cutting plane line. In the embodiment shown in FIG. 2, the touch frame bar 230 comprises a cover plate 231, a touch circuit board 232, a haptic feedback module 233A, and a light source module 234. The cover plate 231 has symbolic patterns P (shown in FIG. 1). The symbolic pattern P, for example, is a function key; however, the present disclosure is not limited thereto. The touch circuit board 232 is opaque and disposed under the cover plate 231. The light source module 234 is disposed between the cover plate 231 and the touch circuit board 232. More specifically, the light source module 234 comprises a light guide plate 234a and a light-emitting member 234b. The light guide plate 234a is disposed between the cover plate 231 and the touch circuit board 232. The light-emitting member 234b is disposed on the touch circuit board 232 and configured to emit light toward the light guide plate 234a. The light guide plate 234a is adhered to the bottom surface of the cover plate 231 through the adhesive layer 239. The touch circuit board 232 is adhered to the bottom surface of the light guide plate 234a through the adhesive layer 239. The haptic feedback module 233A is disposed on one side of the touch circuit board 232.

In some embodiments, the adhesive layer 239 of this disclosure may be (but is not limited to) Optical Clear Adhesive (OCA).

As shown in the embodiment in FIG. 1, the input device 200A has an outer side edge 200a extending in a width direction DW. The outer side edge 200a and the touch frame bar 230 have a first width W1 and a second width W2 respectively in the width direction DW. A ratio of the second width W2 to the first width W1 is less than 20%. Thus, the user can effectively avoid pressing the touch frame bar 230 by accident while grabbing the outer side edge 200a of the input device 200A as the display 110 remains open at the same time.

Speaking in more details, when the display 110 remains open, the center of gravity of the electronic device 100 in the width direction DW is generally located at the position from the input device 200A, close to the edge of the display 110, with a downward distance of 0.25 to 0.5 times the first width W1. More specifically, when the weight ratio of the display 110 and the host computer, on the same side of the input device 200A, is 1:1, the center of gravity is generally located at the position from the input device 200A close to the aforementioned edge, with a downward distance of 0.25 times the first width W1. When the weight ratio is otherwise, the center of gravity is still located at the position from the input device 200A close to the aforementioned edge, with a downward distance varying from 0.25 to 0.5 times the first width W1. In other words, when the user holds the electronic device 100 at the outer side edge 200a of the input device 200A in the width direction DW, the holding position needs to include the aforementioned center of gravity of the electronic device 100 in the width direction DW, so that the user can hold the electronic device 100 steadily. The touch frame bar 230 that has a second width W2 in the width direction DW is located outside the range of the aforementioned center of gravity of the electronic device 100. Therefore the design can effectively prevent the users from pressing the touch frame bar 230 by accident while holding the outer side edge 200a of the input device 200A.

In the embodiment shown in FIG. 2, the input device 200A further comprises a holding member 236A. The holding member 236A is mounted under the cover plate 231 and holds the touch circuit board 232. The holding member 236A, for example, is an upper case (that is, the C part) of the input device 200A. More specifically, the holding member 236A has an accommodating groove S. The touch circuit board 232 of the touch frame bar 230 and the haptic feedback module 233A are disposed in the accommodating groove S, and the cover plate 231 covers the opening of the accommodating groove S. The input device 200A further comprises a plurality of vibration isolators 237, 238. The vibration isolator 237 is located within the accommodating groove S, and the vibration isolator 237 is disposed between the touch circuit board 232 and the holding member 236A. Thus, the touch circuit board 232 is held in the accommodating groove S of the holding member 236A through the vibration isolator 237. In addition, the vibration isolator 238 is located outside the accommodating groove S and close to the surrounding of the accommodating groove S. The vibration isolator 238 is disposed between the cover plate 231 and the holding member 236A. Thus, the cover plate 231 is held on the holding member 236A through the vibration isolator 238. The vibration isolators 237 and 238 have the effect of reducing vibration noise and then effectively release the vibration stress in the horizontal direction. In several embodiments, in order to achieve the aforementioned effect, the Young's modulus of the vibration isolators 237 and 238 may range, but is not limited to, from 0.55 MPa to 0.8 MPa.

As shown in the embodiment in FIG. 2, the haptic feedback module 233A comprises an embedded coil layer 233a and a magnet set 233b. The embedded coil layer 233a is disposed on the touch circuit board 232 and is away from the cover plate 231. The magnet set 233b is disposed on the holding member 236A and constitutes a vibration module with the embedded coil layer 233a. The vibration module, constituted by the magnet set 233b and the embedded coil layer 233a, can have the movement in the form of a horizontal linear motor. However, the present disclosure is not limited thereto. In practical implementation, by changing the magnetic pole direction of the magnet set 233b, the vibration module, constituted by the magnet set 233b and the embedded coil layer 233a, can have the movement in the form of a vertical linear motor.

As shown in FIG. 1, the first display area 231a is connected with the second display area 231b in the length direction DL. The touch frame bar 230 has a first length L1 in the length direction DL. Every second display area 231b has a second length L2 in the length direction DL. By setting the ratio of the second length L2 of the second display area 231b to the first length L1 of the touch frame bar 230 to be less than 15% and having the vibration module, constituted by the magnet set 233b and the embedded coil layer 233a, correspondingly disposed under the second display area 231b, feedback can be enhanced when important keys are pressed. For example, in reference to FIG. 1, when the user taps the symbolic pattern P of the second display area 231b, since the position is close to the vibration module disposed thereunder, the user will feel more significant vibration. When the user taps the symbolic pattern P of the first display area 231a, since the position is relatively away from the vibration module dispose thereunder, the user will feel less significant vibration.

In the embodiment shown in FIG. 2, the bottom of the holding member 236A has grooves 236a. The magnet set 233b is held within the groove 236a and disposed correspondingly to the embedded coil layer 233a. The magnet set 233b and the embedded coil layer 233a are located separately on two opposite sides of the holding member 236A.

In the embodiment shown in FIG. 2, the bottom of the touch circuit board 232 is installed with a processor 235. The touch circuit board 232 has a touch electrode layer disposed thereon (not shown in the diagram). The touch electrode layer is configured to detect touch and operations of the user on the cover plate 231 through finger, stylus, or other touch tools, and generates touch input signals correspondingly. The processor 235 is configured to control the vibration module on activating vibration in response to the touch and operations of the user.

In the embodiment shown in FIG. 2, the haptic feedback module 233A further comprises a plurality of force sensors 233c. The force sensors 233c are disposed on the touch circuit board 232. The force sensors 233c are configured to respond to the deformation (for example, deformation created when the user presses the cover plate 231) of the touch circuit board 232 and to generate force sensing signals. The processor 235 is configured to produce different scales of vibration forces based on the force sensing signals in order to create a haptic feedback effect.

In practical implementation, the haptic feedback module 233A that has force sensors 233c can effectively prevent pressing the keys by accident. For example, by setting when only the scale of force detected by the force sensors 233c is larger than a threshold, the processor 235 will enable the vibration module to vibrate.

In several embodiments as illustrated in FIG. 2, the second display area 231b is defined by the vertical projection of the combination of the vibration module, constituted by the magnet set 233b and the embedded coil layer 233a, and the force sensors 233c, as an additional mechanism of preventing important keys of the second display area 231b from being activated by chance.

In the embodiment shown in FIG. 2, the number of the light guide plates 234a and the number of the light-emitting members 234b are one respectively. In other words, the light-emitting member 234b emits light laterally to the side of the light guide plate 234a. Then, the light guide plate 234a guides the light upward and toward the cover plate 231. The cover plate 231 has a transparent portion in the area of the symbolic pattern P, and the areas beyond the portion of the symbolic pattern P are light-shading portions. Thus, when the light-emitting member 234b emits light, all symbolic patterns P will light up.

Figure 3:
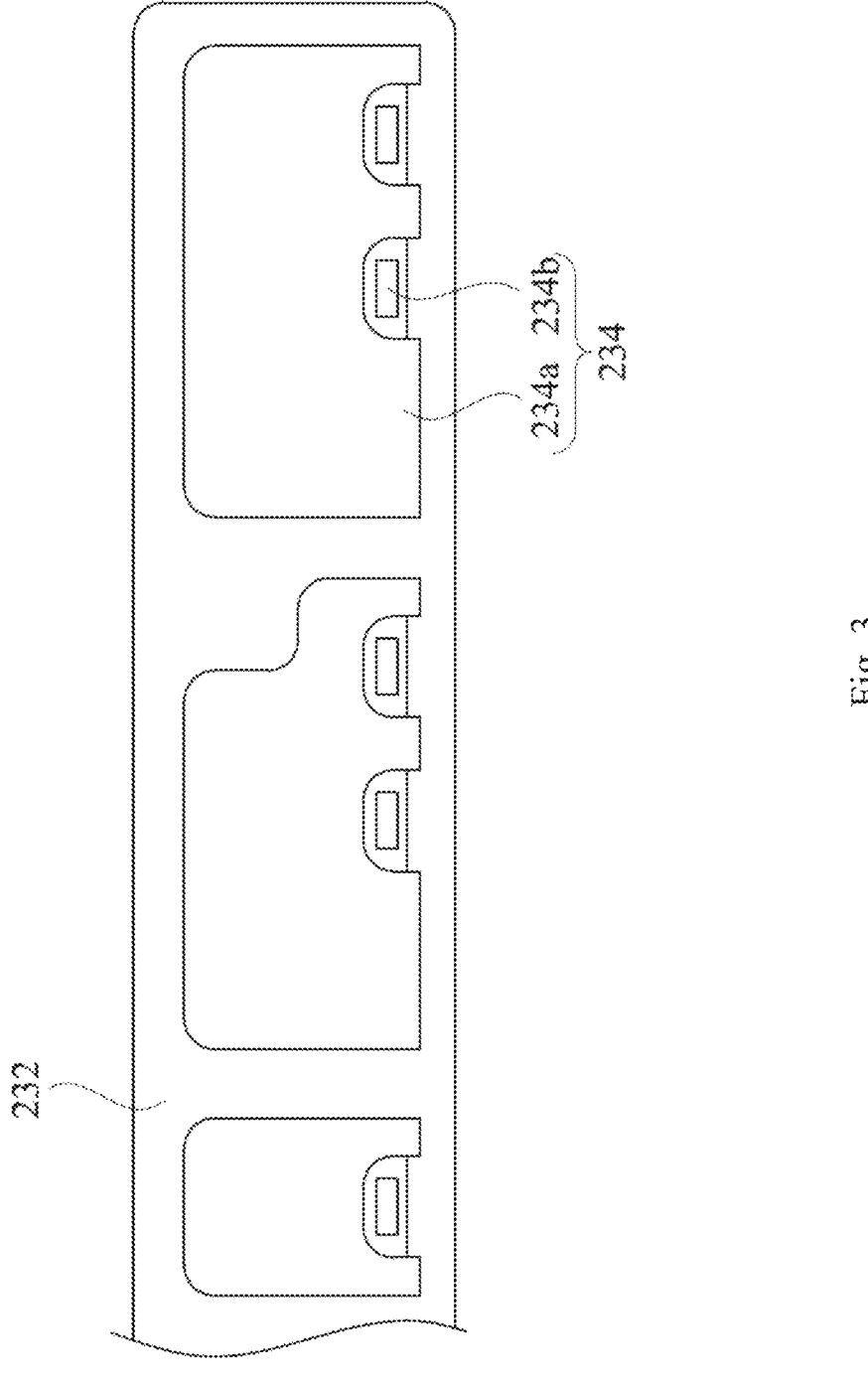
FIG. 3 is a bottom view of some elements of the electronic device of another embodiment of the present disclosure.

Please refer to FIG. 3, which is a bottom view of some elements of the electronic device 100 of another embodiment of the present disclosure. In the embodiment shown in FIG. 3, the light source module 234 comprises a plurality of light guide plates 234a and a plurality of light-emitting members 234b. The light-emitting members 234b are configured to emit light toward the light guide plates 234a respectively. The processor 235 can control the light-emitting members 234b to emit light based on the position of the touch and operations of the user, resulting in the corresponding symbolic pattern P lighting up.

Figure 4:
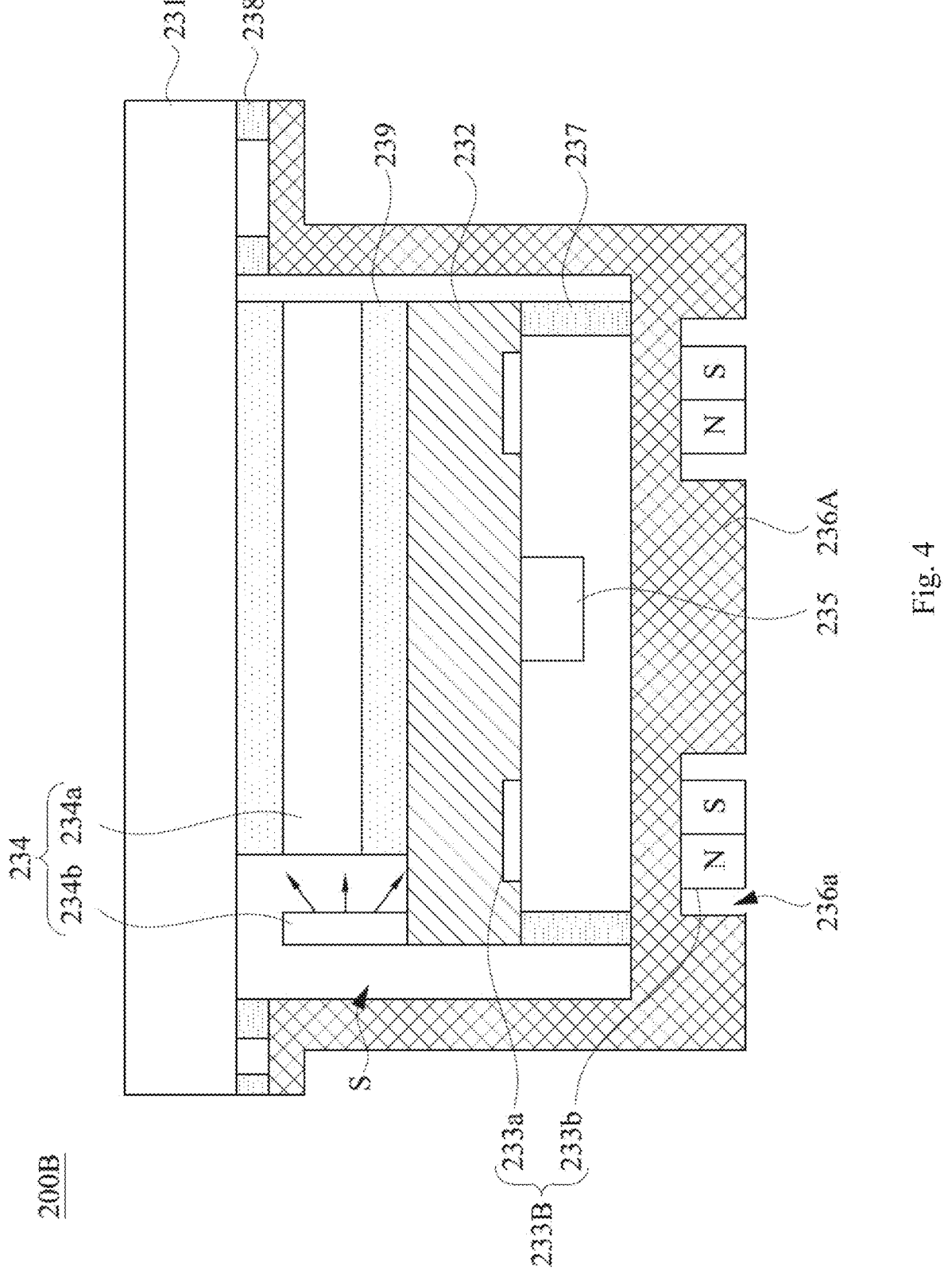
FIG. 4 is a partial cross-sectional schematic diagram of the input device of another embodiment of the present disclosure.

Please refer to FIG. 4, which is a partial cross-sectional schematic diagram of the input device 200B of another embodiment of the present disclosure. In comparison with the embodiment shown in FIG. 2, the haptic feedback module 233B of this embodiment of FIG. 4 does not include the force sensor 233c. All structures, functions, connections, and operational relationships of other elements are identical. Therefore, the aforementioned description can be referred to for relevant explanations and will not be repeated again. Please refer to FIG. 1 and FIG. 4 at the same time. The second display area 231b is defined by the vertical projection of the vibration module, constituted by the magnet set 233b and the embedded coil layer 233a, on the cover plate 231.

Figure 5:
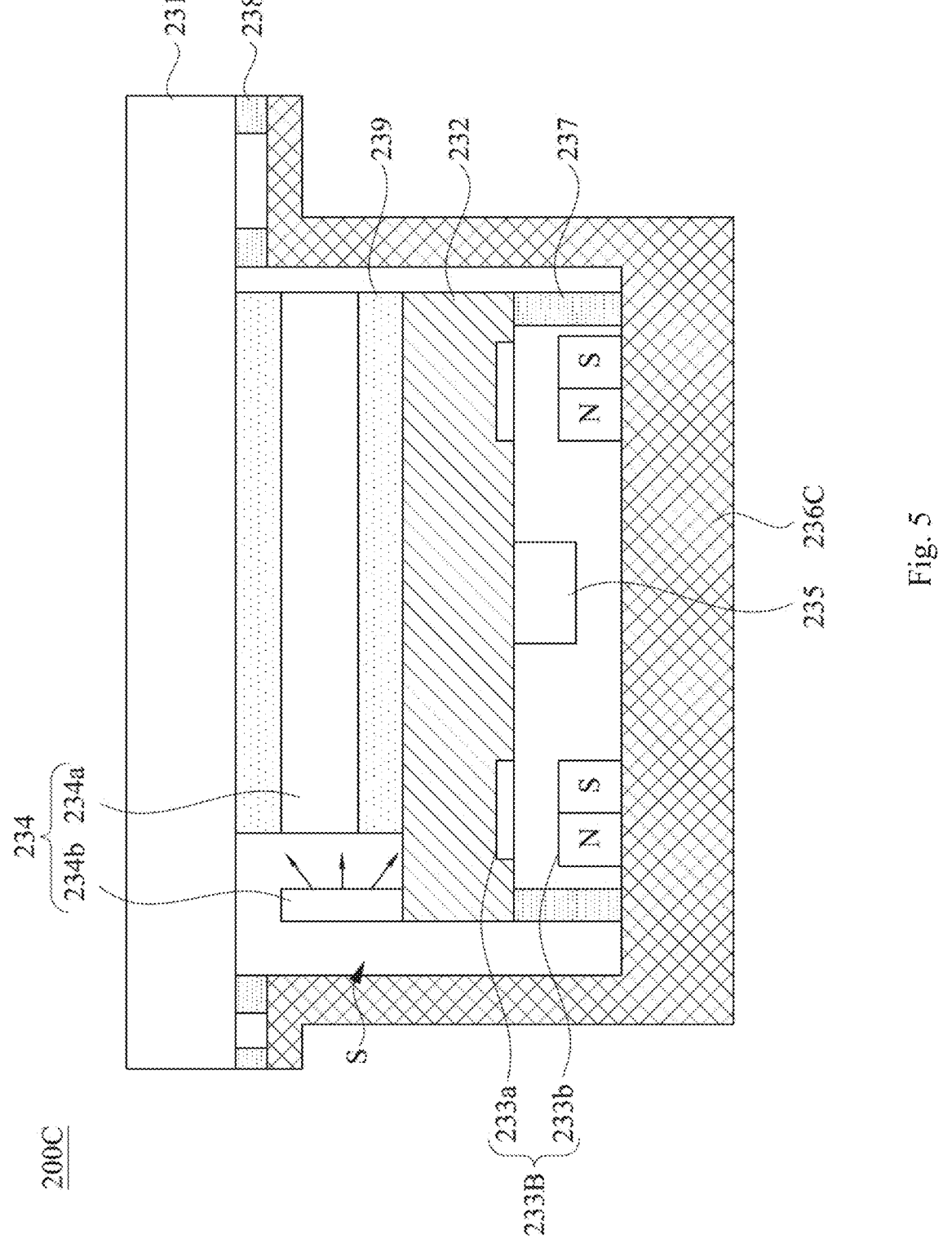
FIG. 5 is a partial cross-sectional schematic diagram of the input device of another embodiment of the present disclosure.

Please refer to FIG. 5, which is a partial cross-sectional schematic diagram of the input device 200C of another embodiment of the present disclosure. In comparison with the embodiment shown in FIG. 4, the holding member 236C of this embodiment in FIG. 5 is without the groove 236a. All structures, functions, connections, and operational relationships of other elements are identical. Therefore, the aforementioned description can be referred to for relevant explanations and will not be repeated again. In general, the magnet set 233*b* is disposed in the accommodating groove S of the holding member 236C, and corresponding directly to the embedded coil layer 233*a*. In other words, the magnet set 233*b* and the embedded coil layer 233*a* are located on the same side of the holding member 236C.

Figure 6:
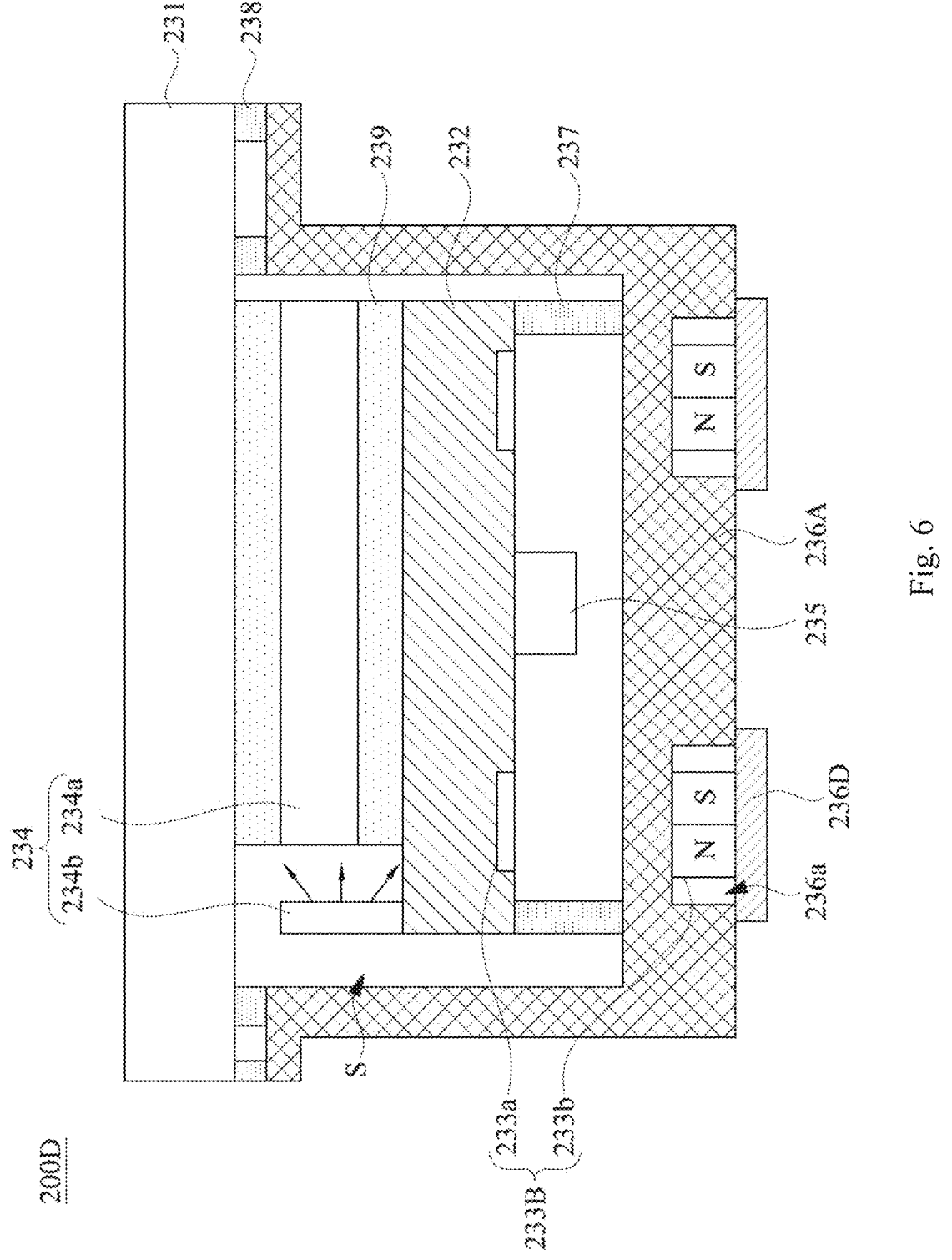
FIG. 6 is a partial cross-sectional schematic diagram of the input device of another embodiment of the present disclosure.

Please refer to FIG. 6, which is a partial cross-sectional schematic diagram of the input device 200D of another embodiment of the present disclosure. In comparison with the embodiment shown in FIG. 4, the embodiment of FIG. 6 further comprises a mounting piece 236D. All structures, functions, connections, and operational relationships of other elements are identical. Therefore, the aforementioned description can be referred to for relevant explanations and will not be repeated again. More specifically, the mounting piece 236D is disposed on the bottom of the holding member 236A and covers the groove 236*a*. Therefore, the magnet set 233*b* can be sealed within the groove 236*a* for protection. In several embodiments, the mounting piece 236D is a silicon steel plate. However, the present disclosure is not limited thereto.

Figure 7:
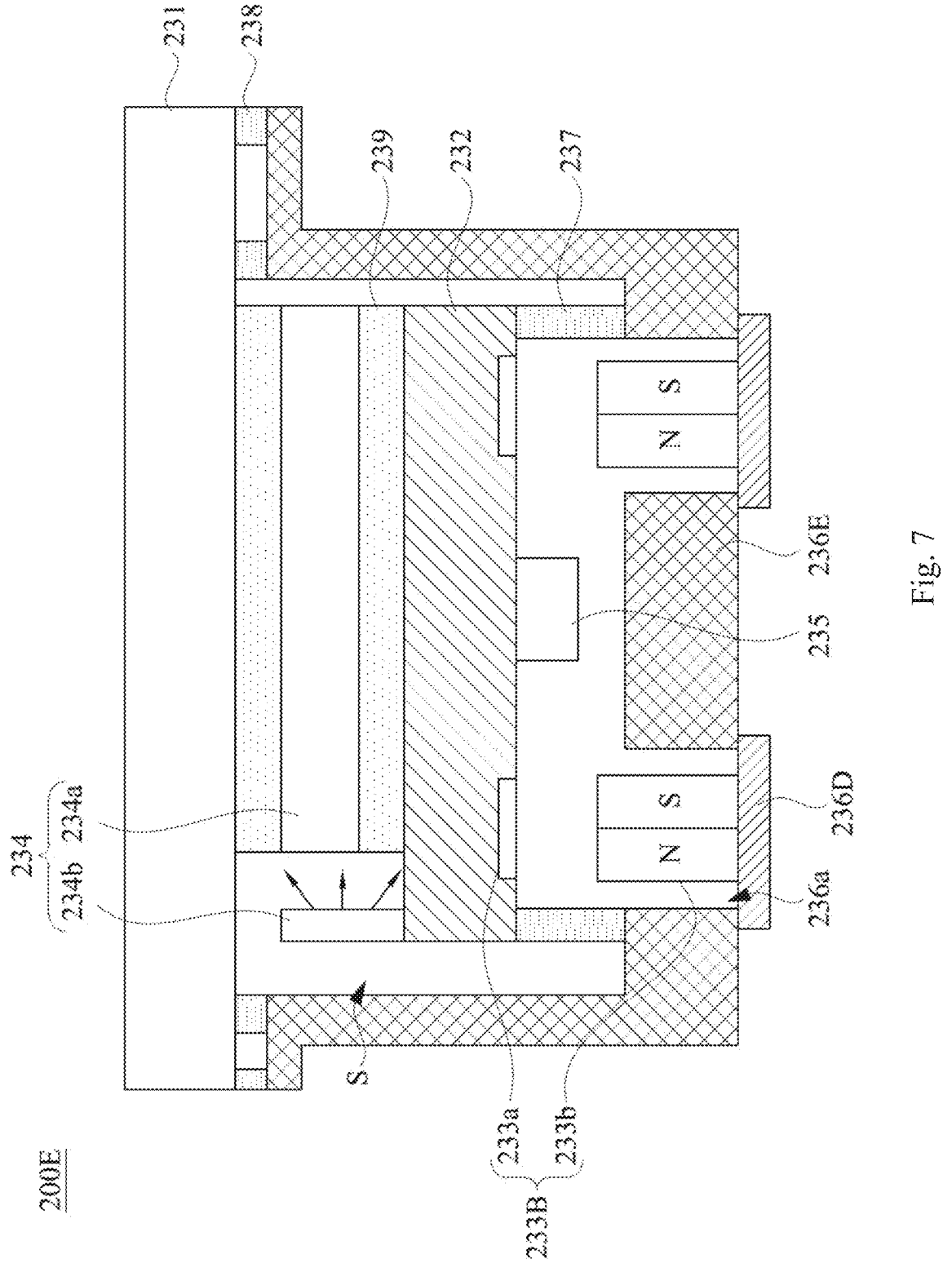
FIG. 7 is a partial cross-sectional schematic diagram of the input device of another embodiment of the present disclosure.

Please refer to FIG. 7, which is a partial cross-sectional schematic diagram of the input device 200E of another embodiment of the present disclosure. In comparison with the embodiment shown in FIG. 6, the holding member 236E of the embodiment of FIG. 7 alters the groove 236*a* into the form of a through hole. All structures, functions, connections, and operational relationships of other elements are identical. Therefore, the aforementioned description can be referred to for relevant explanations and will not be repeated again. More specifically, the magnet set 233*b* is directly disposed on the mounting piece 236D and directly corresponding to the embedded coil layer 233*a*.

In view of the aforementioned descriptions of embodiments of the present disclosure, it is apparently that, in the electronic device of the present disclosure, by setting the ratio of the width of the touch frame bar in the width direction to the width of the outer side edge of the input device in the width direction to be less than 20%, the user can effectively avoid pressing the touch frame bar by accident while grabbing the outer side edge of the input device as the display of the electronic device remains open at the same time. Furthermore, by setting the ratio of the length of every second display area of the cover plate of the touch frame bar in the length direction to the length of the touch frame bar in the length direction to be less than 15% and having the haptic feedback module correspondingly disposed under the second display area, feedback can be enhanced when important keys are pressed. When the haptic feedback module further comprises force sensors, keystrokes by mistake can be prevented effectively.

The aforementioned embodiments are chosen to describe the present disclosure and not intended to limit the scope of the present disclosure in any way. Alternative embodiments will become apparent to those skilled in the art to which the present disclosure pertains without departing from its essence and scope. The scope of the present disclosure is defined by the appended claims rather than the foregoing descriptions and the exemplary embodiments described therein.

COMPONENT SYMBOL

100: electronic device
110: display
200A, 200B, 200C, 200D, 200E: input device
200*a*: outer side edge

210: keyboard set
220: touchpad
230: touch frame bar
231: cover plate
231*a*: first display area
231*b*: second display area
232: touch circuit board
233A, 233B: haptic feedback module
233*a*: embedded coil layer
233*b*: magnet set
233*c*: force sensor
234: light source module
234*a*: light guide plate
234*b*: light-emitting member
235: processor
236A, 236C, 236E: holding member
236*a*: groove
236D: mounting piece
237, 238: vibration isolators
239: adhesive layer
DL: length direction
DW: width direction
L1: first length
L2: second length
P: symbolic patterns
S: accommodating groove
W1: first width
W2: second width

What is claimed is:

1. An electronic device, comprising:
a display; and
an input device, comprising a keyboard set, a touchpad, and a touch frame bar, wherein the touch frame bar comprises:
 a cover plate having symbolic patterns;
 a touch circuit board, which is opaque and disposed under the cover plate;
 a haptic feedback module disposed on one side of the touch circuit board; and
 a light source module disposed between the cover plate and the touch circuit board,
wherein the input device has an outer side edge extending in a width direction; the outer side edge and the touch frame bar have a first width and a second width respectively in the width direction;
and a ratio of the second width to the first width is less than 20%,
wherein the cover plate comprises a first display area and two second display areas; the first display area is connected to and located between the two second display areas in a length direction; the touch frame bar has a first length in the length direction; each of the two second display areas has a second length in the length direction; and a ratio of the second length to the first length is less than 15%, and
wherein each of the two second display areas is defined by a vertical projection of the haptic feedback module on the cover plate.

2. The electronic device of claim 1, wherein the input device further comprises:
a holding member mounted under the cover plate and holding the touch circuit board, and
a plurality of vibration isolators disposed between the touch circuit board and the holding member.

3. The electronic device of claim 2, wherein the haptic feedback module comprises:

an embedded coil layer disposed on the touch circuit board and away from the cover plate, and a magnet set disposed on the holding member and constituting a vibration module with the embedded coil layer.

4. The electronic device of claim 3, wherein each of the two second display areas is defined by a vertical projection of the vibration module on the cover plate.

5. The electronic device of claim 3, wherein the haptic feedback module further comprises a plurality of force sensors disposed on the touch circuit board.

6. The electronic device of claim 5, wherein each of the two second display areas is defined by a vertical projection of a combination of the vibration module and the plurality of force sensors on the cover plate.

7. The electronic device of claim 1, wherein the light source module comprises:

at least one light guide plate disposed between the cover plate and the touch circuit board, and at least one light-emitting member disposed on the touch circuit board and configured to emit light toward the at least one light guide plate.

8. The electronic device of claim 7, wherein a number of the at least one light guide plate and a number of the at least one light-emitting member are plural; and the light-emitting members emit the light toward the light guide plates respectively.

9. An electronic device, comprising:

a display; and an input device, comprising a keyboard set, a touchpad, and a touch frame bar, wherein the touch frame bar comprises:

a cover plate having symbolic patterns;

a touch circuit board, which is opaque and disposed under the cover plate;

a haptic feedback module disposed on one side of the touch circuit board;

a light source module disposed between the cover plate and the touch circuit board;

a holding member mounted under the cover plate and holding the touch circuit board, and a plurality of vibration isolators disposed between the touch circuit board and the holding member, wherein the input device has an outer side edge extending in a width direction; the outer side edge and the touch frame bar have a first width and a second width respectively in the width direction;

and a ratio of the second width to the first width is less than 20%, and wherein the cover plate comprises a first display area and two second display areas; the first display area is connected to and located between the two second display areas in a length direction; the touch frame bar has a first length in the length direction; each of the two second display areas has a second length in the length direction; and a ratio of the second length to the first length is less than 15%.

10. The electronic device of claim 9, wherein the haptic feedback module comprises:

an embedded coil layer disposed on the touch circuit board and away from the cover plate, and a magnet set disposed on the holding member and constituting a vibration module with the embedded coil layer.

11. The electronic device of claim 10, wherein each of the two second display areas is defined by a vertical projection of the vibration module on the cover plate.

12. The electronic device of claim 10, wherein the haptic feedback module further comprises a plurality of force sensors disposed on the touch circuit board.

13. The electronic device of claim 12, wherein each of the two second display areas is defined by a vertical projection of a combination of the vibration module and the plurality of force sensors on the cover plate.

14. The electronic device of claim 9, wherein the light source module comprises:

at least one light guide plate disposed between the cover plate and the touch circuit board, and at least one light-emitting member disposed on the touch circuit board and configured to emit light toward the at least one light guide plate.

15. The electronic device of claim 14, wherein a number of the at least one light guide plate and a number of the at least one light-emitting member are plural; and the light-emitting members emit the light toward the light guide plates respectively.

16. An electronic device, comprising:

a display; and an input device, comprising a keyboard set, a touchpad, and a touch frame bar, wherein the touch frame bar comprises:

a cover plate having symbolic patterns;

a touch circuit board, which is opaque and disposed under the cover plate;

a haptic feedback module disposed on one side of the touch circuit board; and a light source module disposed between the cover plate and the touch circuit board, wherein the input device has an outer side edge extending in a width direction; the outer side edge and the touch frame bar have a first width and a second width respectively in the width direction;

and a ratio of the second width to the first width is less than 20%, and wherein the light source module comprises:

at least one light guide plate disposed between the cover plate and the touch circuit board, and at least one light-emitting member disposed on the touch circuit board and configured to emit light toward the at least one light guide plate.

17. The electronic device of claim 16, wherein a number of the at least one light guide plate and a number of the at least one light-emitting member are plural; and the light-emitting members emit the light toward the light guide plates respectively.

18. The electronic device of claim 16, wherein the input device further comprises:

a holding member mounted under the cover plate and holding the touch circuit board, and a plurality of vibration isolators disposed between the touch circuit board and the holding member.

19. The electronic device of claim 18, wherein the haptic feedback module comprises:

an embedded coil layer disposed on the touch circuit board and away from the cover plate, and a magnet set disposed on the holding member and constituting a vibration module with the embedded coil layer.

20. The electronic device of claim 19, wherein the cover plate comprises a first display area and two second display areas; the first display area is connected to and located between the two second display areas in a length direction; and each of the two second display areas is defined by a vertical projection of the vibration module on the cover plate.

* * * * *